July 27, 1926.
S. G. DOWN.
FLUID PRESSURE BRAKE
Filed Feb. 26, 1925
1,593,707
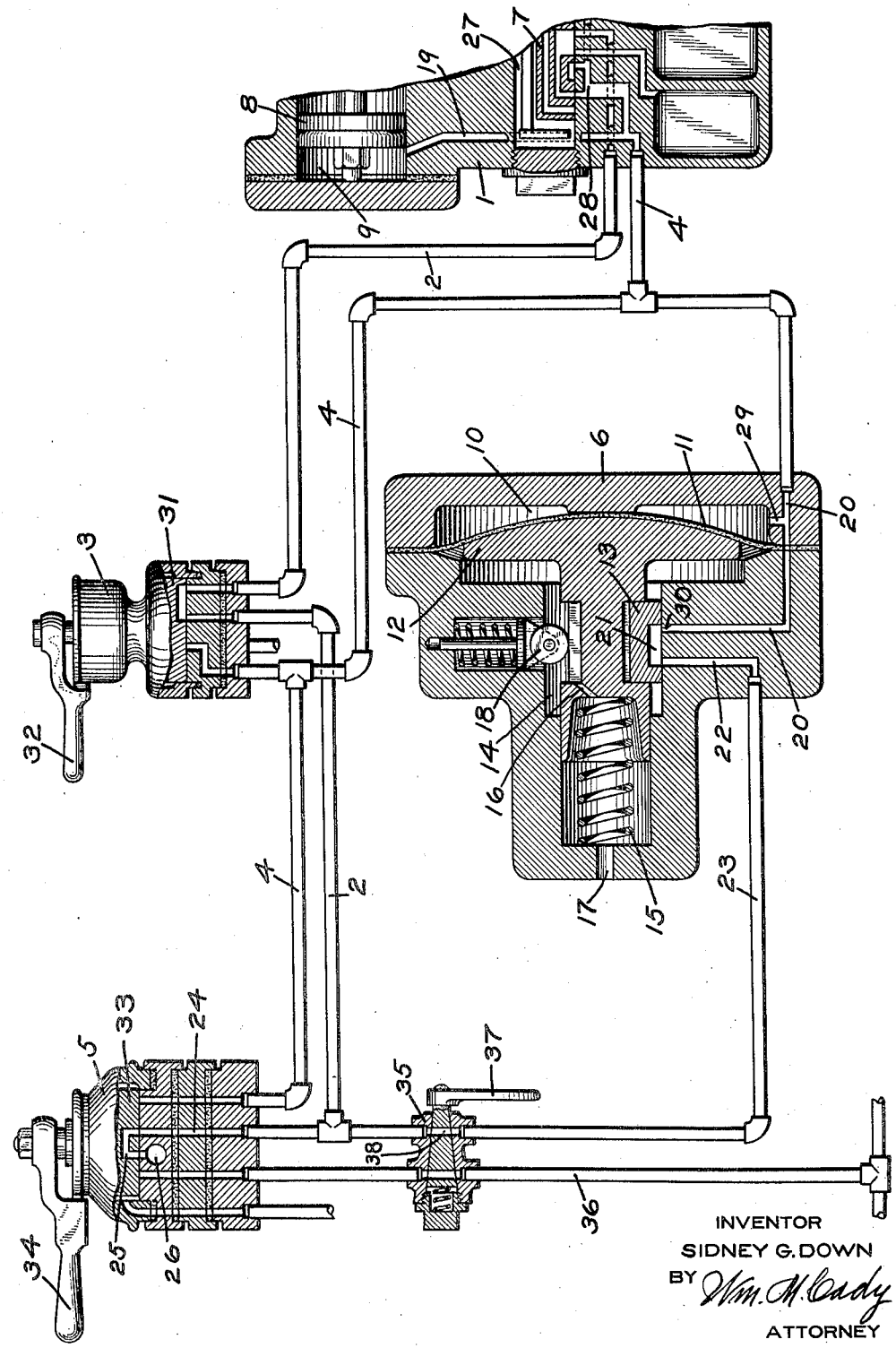
INVENTOR
SIDNEY G. DOWN
BY *Wm. M. Cady*
ATTORNEY Patented July 27, 1926.

1,593,707

UNITED STATES PATENT OFFICE.

SIDNEY G. DOWN, OF PITTSBURGH, PENNSYLVANIA, ASSIGNOR TO THE WESTINGHOUSE AIR BRAKE COMPANY, OF WILMERDING, PENNSYLVANIA, A CORPORATION OF PENNSYLVANIA.

FLUID-PRESSURE BRAKE.

Application filed February 26, 1925. Serial No. 11,713.

This invention relates to fluid pressure brakes and more particularly to a locomotive brake equipment.

In a well known locomotive brake equipment commonly used in railroad service, a distributing valve device is provided, comprising an equalizing valve device, and an application valve device including a piston contained in an application cylinder. The equalizing valve device is adapted upon a decrease or increase in train pipe pressure, to respectively supply or release fluid under pressure to and from the application cylinder.

The locomotive brake equipment includes an automatic brake valve device for controlling the brakes on the locomotive and the train brakes, and an independent brake valve device for controlling the brakes on the locomotive, independently of the train brakes.

When both brake valves are in normal running position, the brakes are released and the application cylinder of the distributing valve device on the locomotive is connected, through ports in the equalizing valve device, a distributing valve release pipe, and through ports in both brake valves with the atmosphere.

However, if by the jar of the locomotive, or through variations in brake pipe pressure due to fluctuations in feed valve pressure, or otherwise, the equalizing valve device should accidentally be shifted to a position cutting off the communication from the application cylinder, through the distributing valve release pipe to atmosphere, any fluid under pressure leaking into the application cylinder will be retained therein and may eventually cause an application of the brakes, which in turn may cause overheating and possible slipping of the driving wheel tires.

The principal object of my invention is to provide means for obviating the above described difficulty.

In the accompanying drawing, the single figure is a diagrammatic view, partly in section, of a locomotive brake equipment embodying my invention and showing only that portion of the distributing valve, which is thought necessary for a clear understanding of the present invention.

In order to accomplish the object of my invention, I provide means for directly connecting the application cylinder to atmosphere when the automatic brake is in running position and adapted to automatically close said direct communication, when a brake application is initiated from any point in the train, as for example, by the bursting of a hose or opening of a conductor's valve.

As shown in the drawing, the equipment may comprise a distributing valve device 1, an independent brake valve device 3, an automatic brake valve device 5, and in addition, an application cylinder exhaust controlling valve device 6.

The distributing valve device 1 comprises the usual equalizing portion including a main slide valve 7 contained in a valve chamber 27 and an application portion including a piston 8 contained in an application cylinder 9.

The valve device 6 may comprise a casing in which is formed a chamber 10 containing a flexible diaphragm 11. Engaging the opposite face of the diaphragm 11 is a follower plate 12, having a stem for operating a slide valve 13, which is contained in valve chamber 14. Interposed between the end of said stem and the rear end wall of the valve casing is a spring 15. The valve chamber 14 is constantly open to the atmosphere by way of a port 16 in the follower plate stem and atmospheric port 17 in the casing, and a spring pressed roller 18 engaging a bearing face on the follower stem is provided to ensure that the slide valve 13 will be held firmly to its seat.

The independent brake valve 3 may comprise a casing containing a rotary valve 31, adapted to be operated by a handle 32. The automatic brake valve may also comprise a casing containing a rotary valve 33 adapted to be operated by a handle 34.

In operation, with the automatic and independent brake valves in running position, the application cylinder 9 is connected to the exhaust through the distributing valve release pipe 2, so that the pressure in chamber 10, which is connected to the application cylinder pipe 4, is also atmospheric, thereby permitting the spring 15 to maintain the diaphragm 11 and slide valve 13 in the position shown in the drawing.

In this position of slide valve 13, cavity 21 connects passage 20 with passage 22, thereby completing a direct communication from application cylinder 9 to atmosphere, by way of passage 19, application cylinder pipe 4, passage 20, cavity 21, passage 22, pipe 23, which is connected to the usual distributing valve release pipe 2, port 24 in the rotary valve seat, cavity 25 in rotary valve 33 of the automatic brake valve device 5 and atmospheric port 26 in the rotary valve seat.

If the slide valve 7 of the equalizing valve device should shift, so as to cut off the usual exhaust from the application cylinder 9, through the distributing valve release pipe 2, and leakage into the application cylinder 9 should occur, then such leakage will be vented to the atmosphere by way of cavity 21 in slide valve 13 and pipe 23.

If an application of the brakes is effected by operation of the automatic brake valve 5, the distributing valve release pipe 2 will be blanked, so that the pipe 23 will also be cut off from the atmosphere and consequently fluid cannot escape from the application cylinder, regardless of the position of slide valve 13.

If, however, a heavy brake application is initiated from a point in the train, as by operation of a conductor's valve or the bursting of a hose, although the automatic brake valve may be in running position, connecting the pipe 23 with atmosphere, the brakes on the locomotive will not be released for the following reason. When the equalizing portion of the distributing valve is operated by the reduction in brake pipe pressure, fluid under pressure is supplied to the application cylinder at a correspondingly rapid rate. Fluid then flows through the application cylinder pipe 4 to the diaphragm chamber 10.

The passage 20 is restricted at 30 to such a degree that when fluid is supplied to the application cylinder 9 at a high rate, the pressure in chamber 10 will build up faster than it can flow through the restriction 30, in passage 20, with the result that the pressure in chamber 10 quickly becomes sufficient to overcome the pressure exerted by the spring 15 and deflects the diaphragm 11 to the left. The movement of the follower plate 12, caused by the deflection of diaphragm 11, shifts the slide valve 13 to a position cutting off communication from passage 20 to passage 22, thereby permitting the fluid supplied to application cylinder 9 to apply the brakes in the usual way, the distributing valve release pipe having been cut off from the application cylinder by movement of equalizing slide valve 7 to application position in the usual manner.

In double heading, the automatic brake valve device is left in running position on the second or non-operating engine and if the application cylinder is connected to the exhaust in running position of the brake valve device, as contemplated according to my invention, a service application of the brakes could not be fully held on the second engine, since the diaphragm 11 is intended to operate only when a heavy application of the brakes is made.

In order to prevent loss of air on the second locomotive in double heading, I provide a cut-out cock 35, which may preferably be the cock heretofore employed to cut off communication from the brake pipe to the automatic brake valve device. This cock has an operating handle 37 and is provided with an additional port 38 adapted to establish communication through the pipe 23, when the cock is in its open position, and to cut off said communication in its closed position.

It will now be seen that on the second locomotive, the cock 35 being turned to its closed position, according to the usual practice, the exhaust port 26 is cut off from the pipe 23, thus preventing loss of pressure on the second engine, when a service application of the brakes is effected.

It will now be evident that I have provided means to prevent leakage from causing an undesired application of the brakes, and at the same time ensure that a brake application initiated from a point in the train will be effective on the locomotive.

It will also be seen that with my improvement a service brake application will not be lost on the second locomotive in double heading, since the closing of the cock 35 prevents escape of air from the application cylinder by way of the exhaust port in the brake valve, when the brake valve is in running position.

Having now described my invention, what I claim as new and desire to secure by Letters Patent, is:—

1. In a fluid pressure brake, the combination with a brake application valve device having an application cylinder, of a valve device comprising a movable abutment subject on one side to the pressure in the application chamber and on the opposite side to atmospheric pressure and the pressure of a spring, and a slide valve operated by said abutment for controlling communication from said cylinder to an atmospheric exhaust port.

2. In a fluid pressure brake, the combination with a brake application valve device having an application cylinder, of a valve device comprising a slide valve for controlling communication from said cylinder to an atmospheric exhaust port and a diaphragm subject to the opposing pressures of said cylinder and a spring for operating said valve, upon an increase in pressure in said cylinder at a predetermined rate, so as to cut off communication from said cylinder to said exhaust port.

3. In a fluid pressure brake, the combination with a brake application valve device having an application cylinder, of a valve device for controlling communication from said cylinder to an atmospheric exhaust port and a manually operated cock for cutting off communication from said cylinder, through said valve device to said exhaust port.

4. In a fluid pressure brake, the combination with a brake application valve device having an application cylinder, of a valve device controlled according to the pressure in said cylinder for controlling communication from said cylinder to an atmospheric exhaust port and a manually operated cock for cutting off communication from said cylinder, through said valve device, to said exhaust port.

5. In a fluid pressure brake, the combination with a brake application valve device having an application cylinder, of a valve device for controlling communication from said cylinder to an atmospheric exhaust port, a brake pipe, and a manually operated cut-out cock having a position for closing communication through the brake pipe and for cutting off communication from said cylinder, through said valve device, to said exhaust port.

6. In a fluid pressure brake, the combination with a brake application valve device having an application cylinder, of a valve device for controlling communication from said cylinder to an atmospheric exhaust port, a brake pipe, a brake valve device connected to said brake pipe, and a manually operated cut-out cock for closing communication from the brake pipe to said brake valve device and from the application cylinder to said exhaust port.

In testimony whereof I have hereunto set my hand.

SIDNEY G. DOWN.